United States Patent Office 2,897,045
Patented July 28, 1959

2,897,045

EXTRACTION OF URANIUM

Robert D. Kesler and David D. Rabb, Columbus, Ohio, assignors to the United States of America as represented by the United States Atomic Energy Commission No Drawing. Application February 6, 1950
Serial No. 142,704

8 Claims. (Cl. 23—14.5)

This invention deals with the extraction of uranium values, and in particular with the extraction of uranium from roasted ores, specifically from salt-roasted ores of the carnotite type.

Carnotite-type ores contain uranium and vanadium both of which are usually recovered by leaching the ore with an aqueous solution after roasting. A solution of sodium carbonate has been preferred for the leaching process. Prior to the leaching step, the ore is admixed with sodium chloride and roasted. While this salt-roasting process converts the vanadium into a form in which it is readily complexed by sodium carbonate and its extraction is facilitated, the solubility and consequently the extractability of uranium is unfavorably affected by salt-roasting.

In order to overcome this drawback, a great many experiments have been carried out by the inventors to study the effect of the various ingredients of carnotite ores and also of various additives on the extractibility of uranium.

It is an object of this invention to provide a process for treating carnotite-type ores by which the solubility of uranium, in particular in sodium carbonate solutions, is improved.

For the study, a synthetic uranium ore was prepared which was free from most of the secondary ingredients encountered in naturally occurring carnotite; it consisted of a mixture of 100 g. of silica sand and 0.32 g. of sodium uranyl carbonate, $Na_4UO_2(CO_3)_3$. This synthetic ore, when leached with an aqueous solution of sodium carbonate, yielded a 100% extraction of the uranium present. However, when the ore was mixed with 10% by weight of sodium chloride and roasted at 1560° F. for thirty minutes with 0.12 c.f.m. of air, the uranium extraction with sodium carbonate solution was reduced to 19%.

The effect on the uranium solubility of the individual components occurring in carnotite ores and/or of various additives was then investigated. For this purpose, the same synthetic uranium ore as set forth above was admixed with the ingredients to be tested in various quantities, roasted and then extracted with a sodium carbonate solution. The effect of the following additives was examined: CaO, MgO, $Al_2O_3$, $Fe_2O_3$, $CaF_2$, $Na_3PO_4$, FeS, $V_2O_5$, iron, coke, and $Na_2CO_3$.

While CaO, MgO, $Al_2O_3$, $Fe_2O_3$ and $CaF_2$ were found to be detrimental because the uranium solubility was reduced by their presence, iron, coke, and $Na_2CO_3$ (in amounts of 1 to 5%) were found to have no appreciable effect on the uranium solubility.

Favorable effects, however, were obtained with $Na_3PO_4$, pyrite, sulfur dioxide, phosphorus pentoxide, and in particular with vanadium pentoxide. In the following table the results obtained with these substances are compiled. For the experiments listed there the synthetic ore was mixed with 10% sodium chloride and the additive shown in the table in the quantity listed there, and the mixture was then roasted for thirty minutes at 1560° F. Thereafter, the roasted ore was leached with an aqueous solution of sodium carbonate and the quantity of uranium extracted was determined therein.

Table I

| Type of additive | Quantity of additive, percent by weight of ore | Percent U extracted with $Na_2CO_3$ solution |
|---|---|---|
| $Na_3PO_4$ | 1.5 | 19 |
|  | 5 | 29 |
| Pyrite | 1.5 | 33 |
|  | 5 | 54 |
| $SO_2$ | 256 | 85 |
| $P_2O_5$ | 0.5 | 92 |
|  | 1.5 | 65 |
|  | 5.0 | 74 |
| $V_2O_5$ | 0.5 | 100 |
|  | 1.5 and more | 47 |
|  |  | 100 |

This table shows that the best results are obtained with vanadium oxide, and this substance was studied further. It was found that less than 0.2% of $V_2O_5$ did not yield any improvement and that the minimum quantity of $V_2O_5$ required in order to obtain a complete uranium extraction is 5% by weight $V_2O_5$ per 1% by weight of uranium. This proportion was found to hold true for concentrations of uranium in the synthetic ore of 0.16 and 0.32%, while, for instance, with a uranium content of 0.64% the minimum quantity for complete uranium extraction was 6% by weight of vanadium oxide per 1% by weight of uranium.

The experiments were then repeated with natural carnotite ores. The ore was crushed prior to roasting. While a better extraction is obtained with a finer particle size, a coarser ore was more advantageous in order to avoid dust formation during roasting. For this reason, the 10 to 20 mesh size was found to be most advantageous.

Vanadium pentoxide had to be added prior to salt-roasting in a quantity sufficient to combine any free calcium oxide present as calcium metavanadate and also sufficient to obtain the minimum $V_2O_5$-to-uranium ratio of 5:1 for complete uranium extraction. This is necessary because otherwise the free calcium oxide reacts with the vanadium oxide and the quantity is thus reduced below that required for optimum efficiency. It was found that the percentage of vanadium oxide should be 3.2 times the percentage of free calcium oxide; the formula for the minimum quantity required therefore is: Percent $V_2O_5 \geqq 3.2 \times$ percent $CaO + 5 \times$ percent U.

The analyses of four carnotite ores including a dolomitic shale type of ore are given in the following table.

Table II

| Source of ore | Analyses, percent | | | | | | | | | | | | |
|---|---|---|---|---|---|---|---|---|---|---|---|---|---|
| | U | $V_2O_5$ | $SiO_2$ | CaO | $Fe_2O_3$ | $Al_2O_3$ | $F_2$ | MgO | S | $Na_2O$ | $K_2O$ | $P_2O_5$ | $TiO_2$ |
| Wild Steer mine | 0.34 | 3.40 | 86.16 | 0.79 | .71 | 4.6 | <.01 | 1.4 | .094 | | | | |
| Gyp Valley | 0.57 | 2.88 | 78.77 | 2.54 | 1.19 | 4.0 | .02 | 1.4 | .034 | 0.1 | 1.0 | | |
| Radium 7 | 0.34 | 2.56 | 81.3 | 3.40 | 2.12 | 5.1 | | | <.1 | 0.24 | 0.75 | 0.03 | 0.12 |
| Bald Eagle [1] | 0.72 | 2.60 | | 17.6 | | | | 10.5 | .052 | | | | |

[1] Dolomitic shale type of carnotite ore.

The results obtained with and without the addition of vanadium oxide when the salt-roasted (1560° F. for thirty minutes) ores of Table II were leached with a sodium carbonate solution are given in the following table. It is obvious from this table that vanadium oxide has a very favorable effect on the extractability of uranium.

Table III

| Ore | $V_2O_5$ addition, percent of ore weight | U extraction, percent |
|---|---|---|
| Wild Steer | 0 | 80 |
| | 0.66 | 89 |
| Gyp Valley | 0 | 50 |
| | 7.9 | 83 |
| Radium 7 | 0 | 70 |
| | 7.0 | 83 |
| Bald Eagle | 0 | 15 |
| | 57.0 | 60 |

Similar experiments were carried out with pyrite. While with the synthetic ore pyrite was found to have an improving effect on the solubility with quantities as low as 1.5%, the amount necessary for improving uranium extraction from natural carnotite was found to range from 12 to 16%, depending upon the type of ore. This is probably due to the formation of uranous sulfate.

The quantities of sodium chloride are not critical, but an amount of from 6 to 10% of the ore was found to be best suitable. Roasting with dry air was found to give better results than with air containing a considerable amount of moisture. The best roasting temperature was around 1600° F., 1560° F. being the optimum. The roasting time is preferably not in excess of thirty minutes. The quantity of air should be sufficient to maintain an oxidizing atmosphere for optimum results; in the foregoing experiments, from 0.12 to 0.24 c.f.m. was found suitable. Extraction with the sodium carbonate solution is preferably carried out during agitation of the mixture. The concentration of sodium carbonate solution giving the best results was between 3 and 9%. A quantity of 4 parts of sodium carbonate solution and one part of solids, although not critical, has been found preferable. Wide ranges of temperatures for the leaching solution are suitable, the range between 80° C. and the boiling point being preferred; the very best results were obtained at about 90° C.

It will be understood that this invention is not to be limited to the details given herein but that it may be modified within the scope of the appended claims. For instance, the free calcium oxide present in the carnotite ore may also be tied up as the phosphate, the sulfate or the fluoride instead of as the metavanadate.

What is claimed is:

1. A process for extracting uranium from carnotite ores, comprising adding about 10% of sodium chloride and adding at least 5% by weight of vanadium pentoxide per 1% by weight of uranium to the ore, roasting the mixture thus obtained and leaching the roasted mass with an aqueous solution of alkali carbonate.

2. The process of claim 1 wherein the alkali carbonate is sodium carbonate.

3. The process of claim 1 wherein about 6% by weight of vanadium pentoxide per 1% by weight of uranium is used.

4. The process of claim 1 wherein roasting is carried out at about 1600° F. for thirty minutes.

5. The process of claim 4 wherein the roasting is carried out at 1560° F. for thirty minutes.

6. The process of claim 1 wherein the alkali carbonate is sodium carbonate in a concentration ranging from 3 to 9%.

7. A process for extracting uranium from carnotite ores, comprising adding from 6 to 10% sodium chloride to the ore, adding a substance selected from the group consisting of vanadium oxide, phosphorus oxide, sulfate and fluoride in a quantity sufficient to tie up all of the free calcium oxide present in the ore, adding vanadium pentoxide in a quantity to obtain a ratio of at least from 5 to 6% by weight of vanadium oxide per 1% by weight of uranium, roasting the mixture thus obtained at about 1560° F. for thirty minutes, and leaching the roasted mass with a 3 to 9% aqueous solution of sodium carbonate.

8. A process for extracting uranium from carnotite ores, comprising adding from 6 to 10% of sodium chloride and vanadium pentoxide in a quantity sufficient to correspond to 3.2% of vanadium oxide per 1% of free calcium oxide plus 6% of vanadium oxide for each percent of uranium, roasting the mixture thus obtained at about 1560° F. for thirty minutes, and leaching the roasted mass with a 3 to 9% aqueous solution of sodium carbonate during agitation.

References Cited in the file of this patent

UNITED STATES PATENTS

| 1,049,145 | Radcliff | Dec. 31, 1912 |
| 2,217,665 | Brown | Oct. 15, 1940 |
| 2,471,345 | Nye et al. | May 24, 1949 |